E. R. MAURER.
DEMOUNTABLE RIM.
APPLICATION FILED APR. 5, 1913.
1,228,941.
Patented June 5, 1917.
2 SHEETS—SHEET 1.
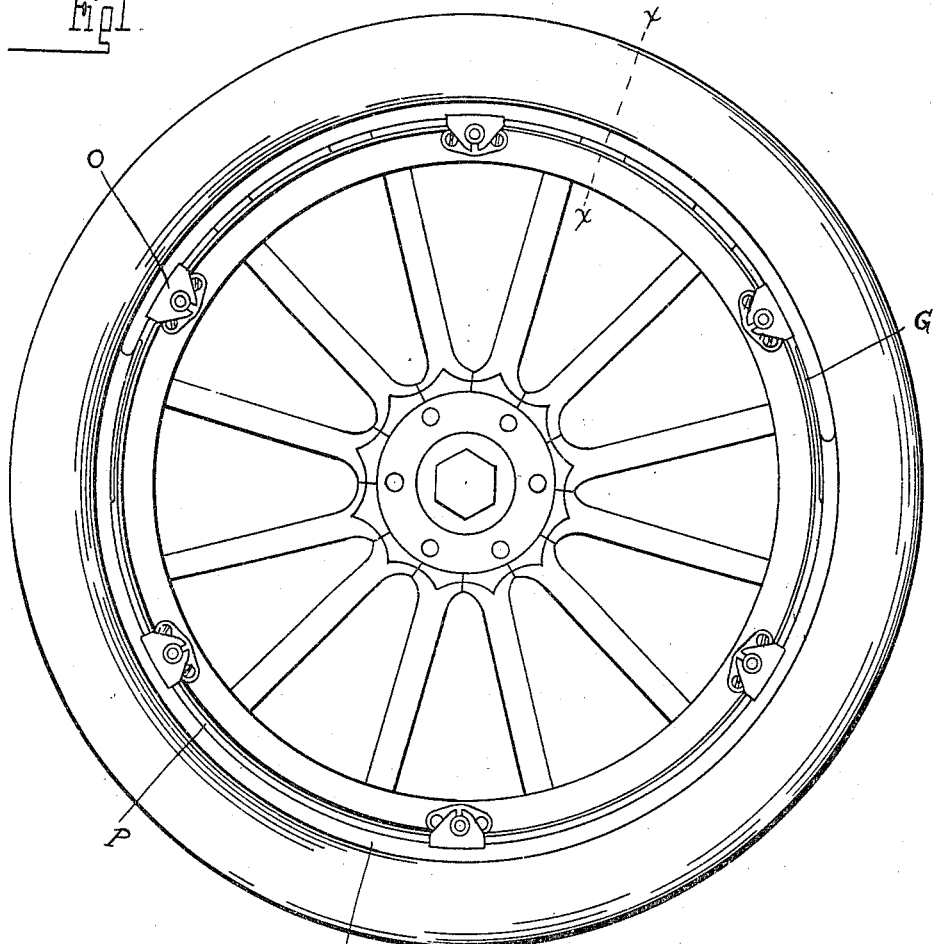
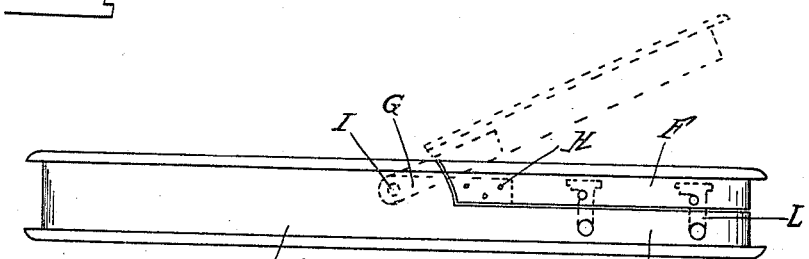
Witnesses
W. K. Ford
James P. Barry
Inventor
Edwin R. Maurer
By Whittemore Hulbert & Whittemore
Attys E. R. MAURER.
DEMOUNTABLE RIM.
APPLICATION FILED APR. 5, 1913.
1,228,941.
Patented June 5, 1917
2 SHEETS—SHEET 2.
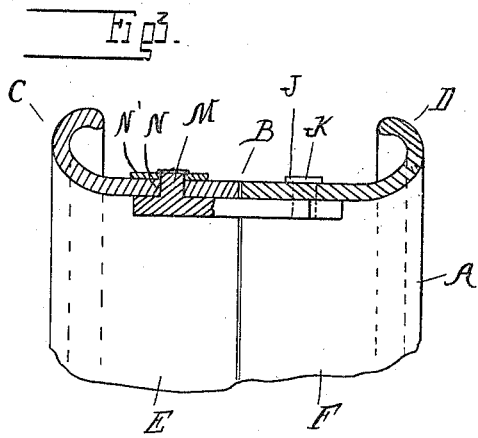
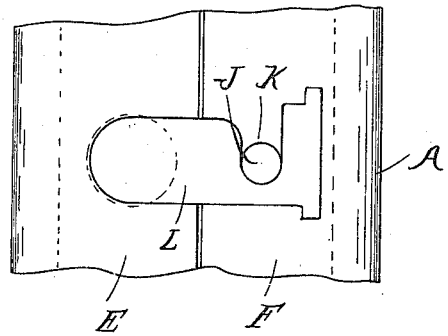
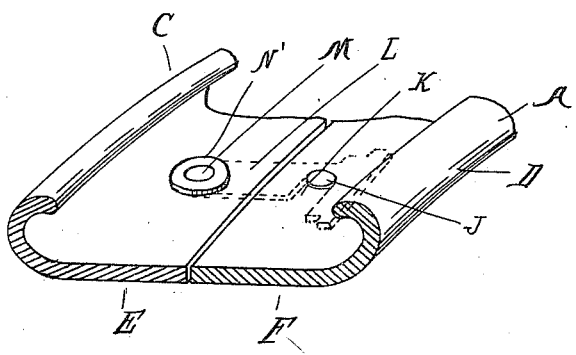
Witnesses
W. K. Ford
James P. Barry
Inventor
Edwin R. Maurer
By Whitmore & Whitmore
Attys

UNITED STATES PATENT OFFICE.

EDWIN R. MAURER, OF DETROIT, MICHIGAN.

DEMOUNTABLE RIM.

1,228,941.  Specification of Letters Patent.  Patented June 5, 1917.

Application filed April 5, 1913. Serial No. 759,022.

*To all whom it may concern:*

Be it known that I, EDWIN R. MAURER, a citizen of the United States of America, residing at Detroit, in the county of Wayne and State of Michigan, have invented certain new and useful Improvements in Demountable Rims, of which the following is a specification, reference being had therein to the accompanying drawings.

My invention relates to demountable rims and consists in the provision of a novel construction of demountable rim whereby the tire may be readily detached from the rim without removing the latter from the felly, or the tire and rim be mounted as a unit.

The invention resides in the peculiar construction, arrangement and combination of parts as will more fully hereinafter appear and as particularly pointed out in the claim.

In the drawings,—

Figure 1 is an elevation of a wheel embodying my invention;

Fig. 2 is an edge elevation of the rim of a tire detached;

Fig. 3 is a section on the line x—x of Fig. 1;

Fig. 4 is a bottom plan view illustrating the locking device; and

Fig. 5 is a fragmentary perspective view, looking from the top.

In automobiles it is quite customary to carry an extra tire upon a demountable rim with the tire inflated in readiness for use. However, it is necessary frequently to detach the tire from the rim for repairs or the like and then replace it, but in the usual construction of demountable rim, while the engaging and disengaging of the rim with the wheel felly may be readily performed, if the tire is to be detached from the rim it is necessary to first remove the rim from the wheel and then detach the tire.

With my improved construction not only may the rim and tire be readily demounted from the felly as a unit, but also the tire may be detached from the rim while the latter is rigidly clamped to the felly. The tire therefore, may be much more quickly and easily removed than in structures where the rim must first be demounted.

As shown, A designates the rim, herein illustrated of the clencher type, composed of a base B and spaced tire-engaging bearings such as the annular flanges C D. The base has a segmental portion thereof longitudinally, centrally divided to form two sections E F, the section E being integral with the remaining segmental portion of the rim and the section F being laterally displaceable in relation to the other section and carrying a segment of the annular flange C. Preferably the section F is mounted upon arms G rigidly connected to the bottom face thereof as by rivets H and these arms are pivoted at I to the underside of the base of the segmental portion I'. This permits the section F to be moved away from the section E and the length of the adjustable portion is such as to allow the tire to be readily removed when the section F is adjusted to the position shown in dotted lines in Fig. 2.

The sections E and F may be locked together in their operative positions in any suitable manner, but I have shown herein a novel and simple locking device which may be easily operated and does not require a special tool to be employed. Thus one of the sections as F is provided with a lug or pin J adapted to be engaged by a slotted portion K of an arm L that is pivoted to the other section. The connection between the arm and its respective section is formed by a pin M cast integral with the arm and pivotally engaging an aperture N in the last-mentioned section. The outer end of the pin is riveted, welded or the like to a washer N', and when the tire is inflated it will exert a pressure upon the washer sufficient to prevent the latter from turning, thereby avoiding accidental disengagement of the slotted portion from the pin, and also preventing rattling of the locking arm.

When the tire is in engagement with the rim and the complementary sections E F locked together, the rim may be attached to the felly in the usual manner as by means of spaced clips O, or demounted from the felly by releasing the clips. When the rim is upon the felly the locking devices and also the arms G lie in the space P between the base of the rim and the felly. In case the tire is to be removed from the rim while the latter is on the felly, it is merely necessary to insert a suitable tool in the space P and move the locking members for the sections to an inoperative position, and to release the locking clips O that are in engagement with the portion of the segmental flange C that is carried by the adjustable section. The latter may then be moved to the position shown in dotted lines in Fig. 2 and the tire detached from the rim. The remaining locking clips O will rigidly secure the rim to the felly.

While I have shown and described the preferred form of my improvement, I do not desire to limit the protection to the exact construction illustrated, as I believe the structure susceptible to various changes without departing from the scope of my invention.

What I claim as my invention is:—

The combination with a two-part rim, of a pin and a hook for engaging said pin respectively mounted upon the inner faces of the rim members, a pivot pin rigidly connected with the hook member and passing through the correlated rim member, and a washer mounted fast upon said pin adjacent the exterior face of the rim, whereby the pressure of a tire carried by the rim acts to prevent motion of the hook.

In testimony whereof I affix my signature in presence of two witnesses.

EDWIN R. MAURER.

Witnesses:
WM. J. BELKNAP,
JAMES P. BARRY.